(12) United States Patent
Petrovic et al.

(10) Patent No.: US 8,233,922 B2
(45) Date of Patent: Jul. 31, 2012

(54) EFFICIENT PAGING MECHANISM WITH SCALABLE BANDWIDTH ALLOCATION

(75) Inventors: Dragan Petrovic, Düsseldorf (DE); Christian Wengerter, Kleinheubach (DE)

(73) Assignee: Panasonic Corporation, Osaka (JP)

( * ) Notice: Subject to any disclaimer, the term of this patent is extended or adjusted under 35 U.S.C. 154(b) by 686 days.

(21) Appl. No.: 12/306,601

(22) PCT Filed: Jun. 28, 2007

(86) PCT No.: PCT/EP2007/005753
§ 371 (c)(1),
(2), (4) Date: Feb. 25, 2009

(87) PCT Pub. No.: WO2008/000489
PCT Pub. Date: Jan. 3, 2008

(65) Prior Publication Data
US 2009/0280823 A1 Nov. 12, 2009

(30) Foreign Application Priority Data
Jun. 29, 2006 (EP) .................................... 06013529

(51) Int. Cl.
*H04Q 7/20* (2006.01)
(52) U.S. Cl. ...................... 455/458; 455/561; 455/422.1; 370/337
(58) Field of Classification Search .................. 455/458, 455/561, 422.1; 370/337
See application file for complete search history.

(56) References Cited

U.S. PATENT DOCUMENTS 6,041,047 A * 3/2000 Diachina et al. ............. 370/347
2004/0209628 A1* 10/2004 Laroia et al. ................. 455/458
2006/0256887 A1* 11/2006 Kwon et al. ................. 375/260

FOREIGN PATENT DOCUMENTS

EP 1 435 750 7/2004

OTHER PUBLICATIONS

International Search Report dated Oct. 8, 2007.
Saraydar C. U., et al., "Minimizing the Paging Channel Bandwidth for Cellular Traffic," Universal Personal Communications, 1996, Record., 1996 5th IEEE InternationalConference on Cambridge, MA, USA, Sept. 29-Oct. 2, 1996, New York, NY, USA, IEEE, US, vol. 2, pp. 941-945.
Third Generation Partnership Project, 3GPP: "TR 23.882, v1.2.3, 3GPP System Architecture Evolution: Report on Technical Options and Conclusions, Release 7," [Online] Jun. 15, 2006, pp. 1-90.
3GPP: 3GPP TR 25.913 V7.1.0 (Sep. 2005), 3rd Generation Partnership Project, Requirements for Evolved UTRA (E-UTRA) and Evolved UTRAN (E-UTRAN), Release 7, Sep. 2005, pp. 1-6.

* cited by examiner

*Primary Examiner* — Danh Le
(74) *Attorney, Agent, or Firm* — Dickinson Wright PLLC

(57) ABSTRACT

A paging method in a mobile communication system, in which a preconfigured frequency range, split into a plurality of frequency subbands, is utilized for communicating within the mobile communication system, includes the steps of selecting at least one frequency subband for transmitting paging information, and transmitting paging information from a network entity, for initiating paging, utilizing the selected at least one frequency subband.

22 Claims, 9 Drawing Sheets

EFFICIENT PAGING MECHANISM WITH SCALABLE BANDWIDTH ALLOCATION

FIELD OF THE INVENTION

The invention relates to paging procedures applied to mobile terminals within a mobile communication system. More specifically, the invention provides a method for paging mobile nodes with different receiving capabilities in a fast and resource efficient manner. Further, the invention also relates to a radio resource control entity for exchanging data with the mobile terminals and to a network entity, for initiating the paging procedure.

TECHNICAL BACKGROUND

Third-generation mobile systems (3G) based on WCDMA radio-access technology are being deployed on a broad scale all around the world. Knowing that user and operator requirements and expectations will continue to evolve, the $3^{rd}$ Generation Partnership Project (3GPP) has begun considering the next major step or evolution of the 3G standard to ensure the long-term competitiveness of 3G. The 3GPP launched a Study Item "Evolved UTRA and UTRAN" (E-UTRA and E-UTRAN), that will investigate means of achieving major leaps in performance in order to improve service provisioning and reduce user and operator costs.

A system with evolved radio access, like in E-UTRA, shall operate in frequency spectrum allocations of different sizes both in uplink and downlink direction, e.g. 1.25 MHz, 2.50 MHz, 5.00 MHz, 10.00 MHz, 15.00 MHz and 20.00 MHz, like suggested in 3GPP TR 25.913, "Requirements for Evolved UTRA (E-UTRA) and Evolved UTRAN (E-UTRAN)", version 7.3.0 (available at http://www.3gpp.org). E-UTRA should be able to operate in a standalone manner, namely without utilizing other carriers than the defined frequency spectrum.

On the other hand, user terminals (UE) themselves have pre-defined frequency bandwidth capabilities that usually are different to that of the system's utilized frequency range. The frequency bandwidth capability of a UE defines the frequency range which a UE can utilize for communicating, i.e. to send and receive data. As there are various types of UEs with different bandwidth capabilities as well as various cells with different frequency bandwidth sizes, it must be assured that every UE can establish a radio link with every kind of cell.

Consequently, for each of these system bandwidth sizes it is respectively possible to define several UE deployments. The UE covers only a specific part of the system's frequency range, wherein the covering is called "UE camping", and the UE tunes its carrier frequency to an appropriate center frequency within the system bandwidth to send and receive data.

The system's frequency range is illustrated in FIG. 1, in this case 20 MHz, further comprising possible camping positions of UEs with capabilities in the frequency domain of 5, 10, 15 and 20 MHz. More specifically, according to the illustration, the system bandwidth is divided into subbands of uniform size. It should however be noted that also subbands of non-uniform size may be defined within the system bandwidth. User terminals with lower bandwidth capabilities can be deployed on more positions in comparison to terminals with higher bandwidth capabilities.

For example, as apparent from FIG. 1, a UE with a 15 MHz capability, denoted a 15 MHz UE, has three possible camping positions, whereas a 5 MHz UE has seven possible deployments within the system bandwidth. Moreover, a 15 MHz UE naturally covers more bandwidth than a 5 MHz UE, thereby providing a broader coverage for receiving and transmitting data.

Further, the UE must be in an active state with the 3GPP interface (e.g. LTE_Active) in order to be able to send and receive user data. In this state a radio connection is established and the UE reports measurements and requirements to its current base station. Then, bearers are established between the UE and the network, carrying first the signaling and later the user data.

During mobility in active state, the UE continuously measures the signal strength of neighboring cells and sends measurement reports to the network. When the network decides to use a new base station, it establishes a new radio link and triggers the UE to handover to the new base station.

In addition to the active state, a mode with lower power consumption is supported. This mode is called idle state (e.g. LTE_Idle) and is used when no user data is sent or received. In idle state the cell reselection is performed by the UE and only tracking area (TA) changes are registered with the network (i.e., not every cell change is reported to the network). The network does not know the actual location of the UE on cell-level, but only on TA-level. In idle state most of UE related contexts are deleted in the 3GPP radio access network (RAN) and it is further possible to page the UE in order to perform transition from LTE_Idle to LTE_Active.

A UE in LTE_Idle state has to receive broadcast cell search parameters and paging information. By standard these relevant cell parameters are transmitted via the paging and broadcast channels, broadcasted in the central band of the cell bandwidth as a default location in the frequency plane, so that all UEs know at which frequency to receive this information. However, any other default frequency band may be defined for transmitting cell broadcast data. For further illustration of the present invention it is assumed that said default frequency subband is the central band of the system bandwidth.

The UE has to be deployed in said central band when in LTE_Idle state. According to FIG. 1, this might be a 5 MHz wide band with its center frequency being equal to the center frequency of the complete system bandwidth of 20 MHz. Consequently, UE camping positions available for deployment in LTE_Active and in LTE_Idle mode are marked with a dark grey, whereas camping positions for deployment in only LTE_Active mode are illustrated in light grey. In particular, assuming the system bandwidth of 20 MHz, shown in FIG. 1, 5 and 10 MHz UEs have only one possible camping position for LTE_Idle and seven, respectively three LTE_Active camping positions.

FIG. 2 shows an exemplary distribution of various traffic channel types in different subbands of a 15 MHz bandwidth system. More specifically, user data traffic in the user plane can be sent and received in every subband of the system via dedicated Radio Bearers, that are established and then notified to the UE. Accordingly, a specific subrange within the subband is assigned to a specific UE in order to transmit to and receive data from the UE.

In addition, other RRC message Radio Bearers for control plane traffic may also be allocated in every subband of the system bandwidth. On the other hand, as a Multimedia Broadcast/Multicast Service (MBMS) has to be received by UEs of all capabilities being in the LTE_Idle state, the service is only transmitted in the central band. In addition to multicast traffic, also broadcast and paging control plane traffic on the downlink has to be transmitted in the central band. It is clearly apparent that the traffic density, measured per frequency unit, is higher in the central band relative to traffic density in the side bands.

The paging procedure is used to transmit paging information to selected UEs in idle mode using the paging control channel (PCCH). This channel is used when the network does not know the location cell of the UE, or the UE is in the cell connected state but utilizing UE sleep mode procedures. Furthermore, upper layers in the network may request paging, to e.g. initiate and establish a signaling connection to the terminal. UTRAN may initiate paging for UEs to trigger a cell update procedure or the reading of updated system information. UTRAN may also initiate paging for UEs to release an RRC connection.

Several transport channels are necessary and provided for the implementation of the paging procedure. In particular, the main channels are the Broadcast Channel (BCH), the Paging Indicator Channel (PICH) and the Paging Transport Channel (PCH).

The BCH is a transport channel that is used to transmit information specific to the E-UTRA network or for a given cell. The most typical data needed in every network is the available random access codes and access slots in the cell, or the type of transmit diversity method used with other channels including PCH and PICH for that cell. As the UE cannot camp to the cell without the possibility of decoding the broadcast channel, this channel is needed for transmission with relatively high power in order to reach all the users within the intended coverage area.

The PICH is operated together with the PCH to provide terminals with efficient sleep mode operation through paging. The PICH informs the terminal via Paging Indicators (PIs) about relevant paging messages that are to be transmitted via the PCH. It should be noted that said paging messages may be alternatively transmitted via downlink shared transport channel (DL-SCH). The former option will be assumed throughout the invention without loosing generality. Each PICH frame carries 288 bits to be used by the paging indicator, whereas 12 bits are left idle for future use. Depending on the PI repetition ratio, there can be 18, 36, 72 or 144 paging indicators per PICH subframe. More specifically, the PIs are assigned to a paging group, and a terminal, once registered to a network, has been allocated a paging group. The PIs appear periodically on the PICH when there are paging messages for any of the terminals belonging to that paging group. In LTE further solutions assuming direct reading of paging messages without PICH usage are possible, but will not be discussed herein, because it does not implicate any changes for the present invention.

The PCH is a downlink transport channel that carries data relevant to the paging procedure, in this case the actual paging data message. In a cell, a single or several PCHs may be established. Each Secondary Common Control Physical Channel (SCCPCH) indicated to the UE in system information may carry up to one PCH. Thus, for each defined PCH there is one uniquely associated PICH channel also indicated.

The frequency subband that is to be used for paging is notified to the UE on the BCH in so called System Information Blocks (SIBs). For example, System Information Block Type 5 comprises the configuration parameters for the PICH and PCH. SIBs usually group together information elements of the same nature. Dynamic parameters are grouped into different SIBs from the more static parameters. The SIBs are organized as a tree, whereas a Master Information Block (MIB) gives references and scheduling information to a number of system information blocks. Furthermore, MIB also comprises timer information about dynamic parameters, to trigger a re-reading by the UE when the timer lapse. The MIB is sent regularly on the BCH and its scheduling is static.

The paging itself is initiated by Paging Indicators (PIs) that are transmitted on the physical channel, PICH. The terminal at first camps in the central band of the system bandwidth and receives cell broadcast information via the BCH. As already mentioned a UE then knows on which frequency the PIs and the paging data message is to be transmitted. Subsequently, the UE periodically listens to the PICH whether relevant PIs are being transmitted.

Once a relevant PI has been detected by the UE, the UE decodes the next PCH frame, mapped on the SCCPCH, to see whether the paging message is intended for it. Accordingly, the paging message comprises, among other information, the International Mobile Subscriber Identity (IMSI) of the mobile terminal, by which the terminal is enabled to discern whether the paging message is indeed intended for it or not.

The less often the PIs appear, the less often the UE needs to wake up from the sleep mode and the longer the battery life becomes. The trade-off is obviously the response time to the network-originated call.

The paging message itself may be expanded relative to paging messages in previous systems. For example, uplink interference information as in SIB7 may be additionally included. For the further illustration of the underlying problem and also for the embodiments of the invention it is assumed that the size of the paging message is two Resource Blocks. The assumed amount of two Resource Blocks for one paging message is however just an example used for the illustration of embodiments. A skilled person is also able to apply the teachings of the various embodiments to paging messages split into a different number of Resource Blocks.

A Resource Block is defined in the frequency-time domain as may be appreciated in FIG. 2. The Resource Block is a specific time-slot (subframe) for a specific frequency sub-range within the system bandwidth used for transmitting data. Within the Resource Block data may be transmitted, which is limited by the length of the subframe (~0.5 ms) and the frequency bandwidth (~375 kHz). Naturally, both the length of the subframe and the bandwidth can be adapted by a skilled person to the necessities of the specific implementation without relevant effect on the invention's embodiments. Furthermore, it is also possible to encode the data transmitted in the Resource Block to specific mobile nodes, similar to CDMA. Though not explicitly explained in regard to the various embodiments of the invention it is further possible for a skilled person to implement such a code multiplexing to the embodiments of the present invention.

A further important transmission option is the specific diversity technique, implemented for improving the reception quality of a transmitted signal. In a Resource Block, the amount of frequency diversity is small, namely about 375 kHz. It is widely known that by receiving and processing multiple versions of the same transmitted signal the reliability of the message reception may be improved. Different diversity techniques are possible which are mainly characterized by the way the signals are received. This includes among other options: space diversity, polarization diversity, time diversity or frequency diversity. For the following, only time and frequency diversity are relevant and hence will be briefly explained in further detail.

In using the time diversity technique, the same signal is received more often, due to the transmission of the signal at different time instances. The signal is transmitted in multiple subframes that are separated by a pre-determined coherence time. This technique is easy to implement, however, the terminal has to wait for the diversity repetition of the signal. Hence, the delay of the mobile node, for moving from a camped state, LTE_Idle, to an active state, LTE_Active, such that a user traffic plane is established, is increased.

The frequency diversity relies on the fact that the noise of signals transmitted at different carrier frequencies is not correlated. Therefore, the same signal may be transmitted via multiple channels separated by a specific bandwidth, to improve the reception of the message.

Subsequently, the received multiple signals have to be combined within the terminal to achieve a higher reliability resulting from the thus improved signal. As this is however not relevant for this invention, no further details are discussed in this regard.

FIG. 3 shows a usual frequency allocation for the paging data message in a paging procedure, in which the configuration of the PCH, carrying the paging message is static and cannot be changed. In this example, the system has a bandwidth of 20 MHz and two different UE capabilities of 10 and 15 MHz are considered. Apparently, the frequency range covered by both UEs comprises the central subband, subband 2. The paging data message, consisting of Resource Blocks 1 and 2, is transmitted in the central subband, and accordingly received by both UEs. In addition, a frequency diversity repetition is transmitted to increase the signal reliability in the recipients, the UEs. Accordingly, in left subband 1 the paging message, Resource Blocks 1 and 2, is transmitted again within the same subframe. However, the total transmission frequency range within one subframe is now 15 MHz, meaning that the subframe with the two paging messages cannot be received by the 10 MHz UE. Therefore, to achieve relatively reliable transmission of paging for this category of mobile terminals, it is required to repeat both Resource Blocks of the paging message in the time domain after at least maximum coherence time, corresponding to mobile radio channels of UE population. Hence, if the message is received correctly after the time diversity, delay of session setup procedure for network-originated scenarios is increased by the value of the coherence time.

In addition to the disadvantage that not only the latency of the session setup for moving from the LTE_Idle state to the LTE_Active state is increased for terminals of lower capability, a further disadvantage occurs. The resources of the central subband 2 and side subband 1 are used inefficiently, as Resource Blocks of the paging message are repeated in subband 1 to achieve diversity in the frequency domain and in subband 2 to achieve diversity in the time domain.

As already outlined above, a fixed paging procedure has been defined in the prior art. Thus the paging cannot be changed depending upon certain system parameters, which may include the traffic densities in respective frequency subbands, UE bandwidth capability, information importance or other parameters.

SUMMARY OF THE INVENTION

In light of the above mentioned restrictions, the object of the invention is to provide an improved paging procedure for mobile nodes.

The object is solved by the subject matter of the independent claims. Advantageous embodiments of the invention are subject-matters of the dependent claims.

One aspect of the invention is to make the paging procedure more flexible in that the paging frequency subband, that will be used for paging, may be selected and is not fixed to a default band.

A further aspect of the invention is that the above mentioned selection is based on some parameters, like load in the subbands, receiving capabilities of the UEs, or the importance of the paging information.

According to an embodiment of the invention, a paging method in a mobile communication system is provided, wherein a preconfigured frequency range, split into a plurality of frequency subbands, is utilized for communicating within the mobile communication system. The method selects at least one frequency subband for transmitting paging information and transmits the paging information from a network entity, for initiating paging, utilizing the selected at least one frequency subband.

According to a further embodiment, the paging information comprises paging control information and a paging message, wherein the paging control information is transmitted utilizing a default frequency subband within the preconfigured frequency range. The selection of the at least one frequency subband selects the at least one frequency subband for transmitting the paging message. This would lead to an easy implementation and high compatibility in previous systems, as necessary information is transmitted in a fixed subband and the mobile nodes are immediately enabled to receive the control information.

In an additional embodiment the selection of the at least one frequency subband is conducted in the network entity, for initiating paging, or in a radio resource control entity of the radio access network.

According to a further advantageous embodiment, the selected at least one frequency subband is different from the default frequency subband. This would result in a load relieving of the default frequency subband.

In an additional embodiment the paging control information comprises information about the selected at least one frequency subband. Furthermore, a mobile node utilizes a first frequency range for communicating, said first frequency range comprising the default frequency subband. Upon receiving the paging control information, comprising the information about the selected at least one frequency subband, in the mobile node, the first frequency range of the mobile node is shifted so as to include the selected at least one frequency subband for receiving the paging message. This procedure enables low-end terminals also to receive the paging message, not just high-end terminals with a broad frequency range.

In a further advantageous embodiment, a load in each frequency subband is determined. Furthermore, the selection of the at least one frequency subband for transmitting the paging message is based on the determined load in each frequency subband. By making the subband selection dependent of the load therein, a resource efficient paging procedure is provided, that spreads traffic caused by paging to subbands with low load.

According to a further embodiment. in case the load of the default frequency subband is low, the default frequency subband is selected as the at least one frequency subband for transmitting the paging message. Alternatively, in case the load of the default frequency subband is high, the default frequency subband is not selected as the at least one frequency subband, for transmitting the paging message. An easy and efficient way of frequency subband selection for paging is provided to the network operator.

In a further embodiment a plurality of System Information Blocks contain different parts of the paging control information. System Information Blocks are already defined in legacy systems, therefore, an implementation in previous and future systems is facilitated.

According to a specific embodiment the paging message is split into at least one resource block, wherein the at least one resource block is defined by a frequency range and a time range in which data is transmitted. The selection of the at least one frequency subband for transmitting the paging message, selects for each resource block a frequency subband, for transmitting the resource block. The procedure is thereby much more flexible and effective, because each resource may be transmitted via a selectable frequency subband.

In an advantageous embodiment the importance of the paging information within each resource block is further determined. Additionally, the selection of the frequency subband for transmitting each resource block, is further based on its determined importance. Thereby, the network operator may adjust the paging procedure more flexible than just by basing the frequency subband election on the load.

According to a further embodiment of the invention, for each resource block a frequency subrange is determined within the selected frequency subband. Consequently, each resource block is transmitted utilizing its determined frequency subrange. According to the necessities of the system only a small frequency subrange may be allocated to a mobile node, not the complete subband. This enables a more resource efficient paging.

In an advantageous embodiment of the invention, a second paging message, being equal to the paging message, is transmitted. Accordingly, at least one frequency subband for transmitting the second paging message is selected. Subsequently, the second paging message is transmitted from the network entity, for initiating paging, utilizing the at least one frequency subband, selected for transmitting the second paging message. Said second paging message is transmitted as a diversity repetition of the paging message, to increase the reliability of the transmission.

According to a continuation of the previous embodiment, the selection of the at least one frequency subband, for transmitting the second paging message, is based on a determined load in each frequency subband. As the selection is based on current traffic load in the subbands, a resource efficient paging procedure is achieved.

Regarding a further embodiment of the invention, the second paging message is split into at least one resource block, wherein the at least one resource block is defined by a frequency range and a time range, in which data is transmitted. The selection of the at least one frequency subband for transmitting the second paging message, selects for each resource block of the second paging message a frequency subband for transmitting the resource block of the second paging message, based on the determined load in each frequency subband. Similar to an above mentioned advantage, the second paging message, transmitted for diversity repetition, is also transmitted more resource efficient, as the multiple resource blocks are transmitted based on the current load and not just the complete paging message in one piece.

According to a further embodiment of the invention, in case the determined load in each frequency subband, for transmitting the resource block of the second message, is high, the resource block of the second paging message is re-transmitted after a predetermined time utilizing the at least one frequency subband, selected for transmitting the paging message. Again, the flexibility of the paging procedure is enhanced.

In an advantageous embodiment the paging information further includes error correction information for the paging information. At least one frequency subband for transmitting the error correction information is selected. Subsequently, the error correction information is transmitted utilizing the at least one frequency subband, selected for transmitting the error correction information. By including error correction information, the reliability of the paging transmission is considerably increased.

Regarding a further embodiment of the invention, the selection of the at least one frequency subband, for transmitting the error correction information, is based on a determined load of each frequency subband. Resource efficiency is enhanced by enabling a subband selection for the transmission of the error correction information.

In a further embodiment the error correction information for the paging information comprises parity bits for forward error correction. Forward error correction is a widely used correction method and therefore easy to implement.

According to an advantageous embodiment, the network entity, for initiating paging, is a control entity in the radio access network.

Relating to another embodiment, the control entity in the radio access network is a User Plane Entity or a Mobility Management Entity. These entities are provided in new LTE systems and therefore the paging procedure is also applicable in the near future.

According to a further advantageous embodiment, the determination of the load of each frequency subband is conducted in a resource control entity of the radio access network. Subsequently, load information on each frequency subband is transmitted from the resource control entity of the radio access network to the network entity, for initiating paging. The resource control entity has direct access to the frequency subband resources and may therefore determine the load in same, without the need of additional messaging.

In an additional embodiment the radio resource control entity in the radio access network is an Evolved NodeB. This implementation will be needed in the near future.

According to another embodiment of the invention, the network entity, for initiating paging, pages a plurality of mobile nodes. In addition, the network entity, for initiating paging, has information about a first frequency range of each mobile node, that is utilized for communication by the mobile node. Accordingly, the selection of the at least one frequency subband, for transmitting the paging message, is further based on the information about the first frequency range of each mobile node. This achieves a even higher operator flexibility of the paging procedure, as the current capabilities of the mobile nodes in the cell may be further considered.

According to a further embodiment, in case the first frequency range of one of the plurality of mobile nodes, paged by the network entity, for initiating paging, does not comprise the at least one frequency subband, selected for transmitting the second paging message, the second paging message is re-transmitted after a predetermined time utilizing the at least one frequency subband, selected for transmitting the paging message. This enhances the reception of the second paging message for low-end terminals that have no other possibility than waiting for a re-transmission.

Regarding a further advantageous embodiment, an air resource control entity is connected between the network entity, for initiating paging and the mobile node. The network entity, for initiating paging, transmits the paging information to the air resource control entity and the air resource control entity forwards the paging information to the mobile node.

In another embodiment of the invention, upon receiving the paging information in the mobile node, a response message is transmitted, as response to the paging information, to the air resource control entity. Subsequently, upon receiving the response message in the air resource control entity, an identifier of the air resource control entity is further appended to the response message. In addition, the response message is transmitted to the network entity, for initiating paging. Thereby, the network entity for initiating paging is provided with the specific air resource control entity, which is connected to the mobile node, and can forward awaiting data packets to the correct air resource control entity.

According to a further embodiment of the invention, the paging control information further includes transport format indication. This helps the mobile node to faster discern which transport format is utilized by the paging procedure.

In a different embodiment the paging control information is transmitted utilizing a paging indicator channel and a broadcast channel, wherein the broadcast channel utilizes the default frequency subband. Subsequently, the broadcast channel or the paging indicator channel is selected and utilized for transmitting the transport format indication.

Relating to a still advantageous embodiment, the paging entity pages a plurality of mobile nodes, the plurality of mobile nodes utilizing a small frequency range or a wide frequency range, wherein both comprise a default frequency subband. A first transport format indication, comprising configuration information about the small frequency range, is transmitted to the mobile nodes that utilize the small frequency range. Furthermore, a second transport format indication, comprising configuration information about the wide frequency range, is transmitted to the mobile nodes that utilize the wide frequency range. One of the advantages thereof is that different transport formats may be indicated to mobile nodes with different frequency capabilities, and thereby each mobile node only receives and decodes the configuration information that is actually relevant for them.

According to the invention, a radio resource control entity in the radio access network for exchanging data with a plurality of mobile nodes is provided. The radio resource control entity utilizes a preconfigured frequency range, split into a plurality of frequency subbands, for communicating within a mobile communication system. The radio resource control entity is connected to a network entity, for initiating paging and comprises a processor adapted to determine the load in each frequency subband. A transmitter is included to periodically transmit information about the determined load in each frequency subband to the network entity, for initiating paging. A receiver receives paging information from the network entity, for initiating paging, comprising information about a frequency range to be used for transmitting the paging information to the plurality of mobile nodes. In addition, the transmitter is further adapted to transmit the paging information to the plurality of mobile nodes, utilizing the frequency range, comprised within the frequency information.

According to the invention, a network entity for initiating paging of a mobile node is provided. A preconfigured frequency range, split into a plurality of frequency subbands, is utilized for communicating within a mobile communication system. The network entity is connected via a radio resource control entity in the radio access network to a plurality of mobile nodes, comprising the mobile node. Moreover, the network entity comprises a processor adapted to select at least one frequency subband for transmitting paging information. A transmitter is included to transmit the paging information, utilizing the selected at least one frequency subband.

In a further embodiment of the present invention, the network entity for initiating paging further includes a receiver to periodically receive, from the radio resource control entity, information about a determined load in each frequency subband. In addition, the processor selects the at least one frequency subband, for transmitting the paging information, based on the received information about the determined load in each frequency subband.

According to the invention a system for paging a mobile node, comprising at least a network entity, for initiating paging, according to previous mentioned embodiments is provided.

Furthermore, according to the invention, a computer-readable medium storing instructions that, when executed by a processor of a network entity, for initiating paging, causes the network entity to perform the steps of the method according to the previous embodiments is provided.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

The following paragraphs will describe various embodiments of the invention. For exemplary purposes only, most of the embodiments are outlined in relation to a UTRA or E-UTRA communication system and the terminology used in the subsequent sections mainly relates to the UTRA terminology. However, the terminology and the description of the embodiments with respect to a UTRA (E-UTRA) architecture is not intended to limit the principles and ideas of the inventions to such systems.

Also the detailed explanations given in the Technical Background section above are merely intended to better understand the mostly UTRA (E-UTRA) specific exemplary embodiments described in the following and should not be understood as limiting the invention to the described specific implementations of processes and functions in the mobile communication network.

According to the invention, a preconfigured frequency range of the mobile communication system may be defined as the system bandwidth of the system or cell used for communication and usually signaled to terminals over broadcast or another channel.

According to the invention, a frequency subband of the preconfigured frequency range may be defined as a limited part of the frequency range.

According to the invention, paging information may be defined as information that is necessary for paging a mobile node.

According to the invention, a radio resource control entity may be defined as the entity that has access and controls the radio resources in the radio access network.

According to the invention, a first frequency range may be defined as the frequency range that is used by the mobile node for communicating, i.e. sending and receiving data. In other words, it may be defined as the UE's frequency capability for communicating.

Figure 1:
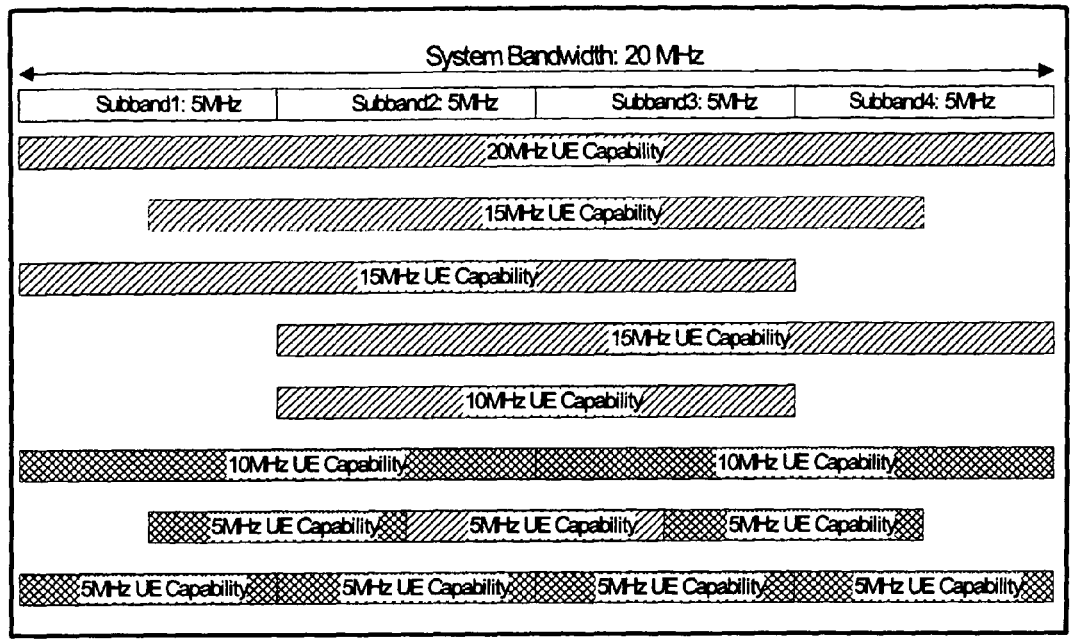
FIG. 1 shows a system's frequency range of 20 MHz, further comprising possible camping positions of UEs with capabilities in the frequency domain of 5, 10, 15 and 20 MHz.
Figure 2:
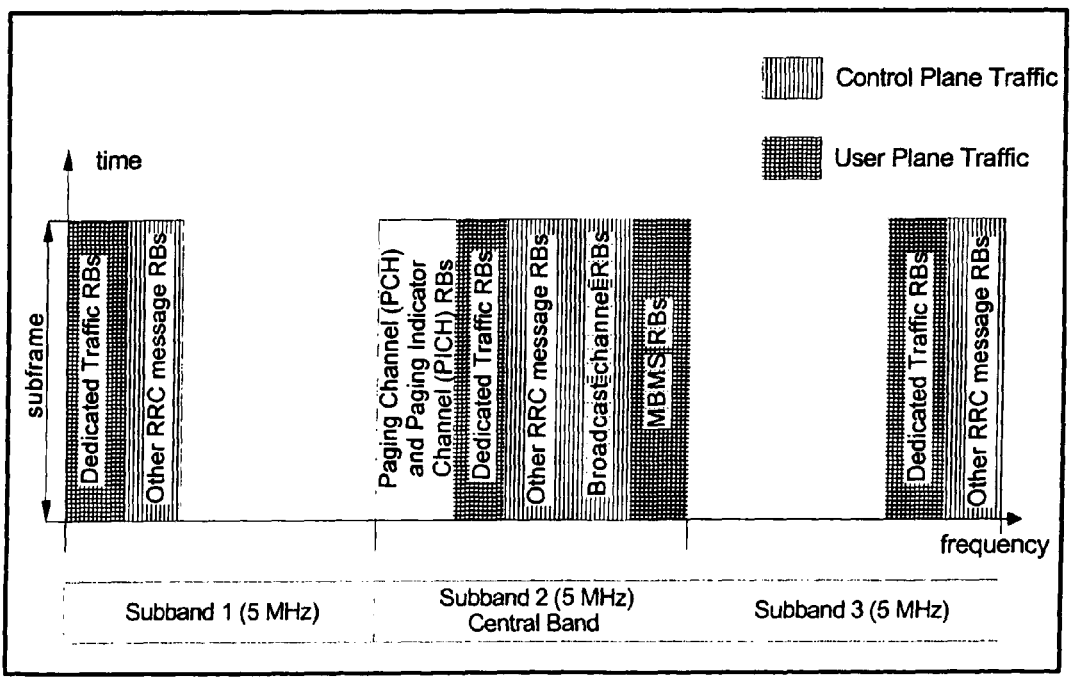
FIG. 2 shows an exemplary distribution of various traffic channel types in different subbands of a 15 MHz bandwidth system.
Figure 3:
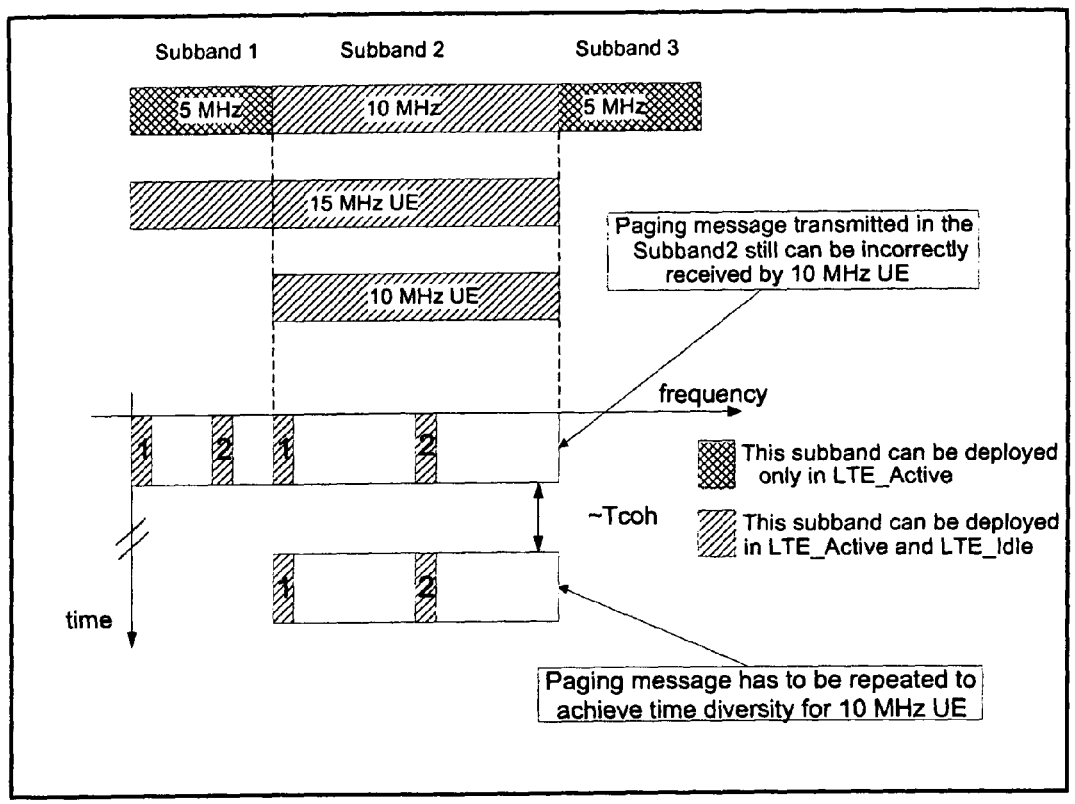
FIG. 3 shows a frequency allocation diagram for a usual paging procedure.
Figure 4:
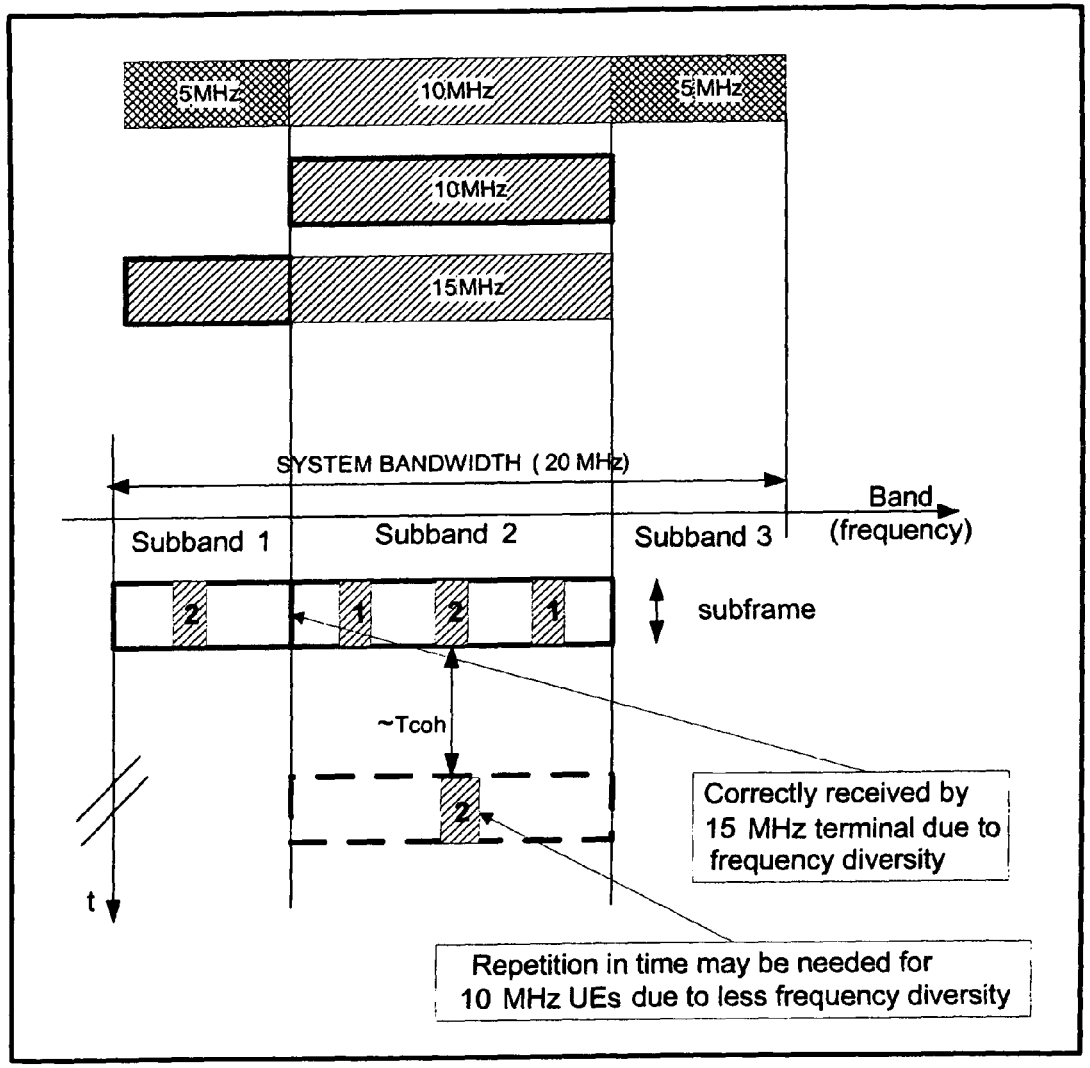
FIG. 4 shows a frequency allocation diagram for a paging procedure according to an embodiment of the present invention.

FIG. 4 shows a frequency allocation of Resource Blocks of the paging message according to one embodiment of the invention. In this and the following embodiments of the invention, the paging message may be transmitted in a frequency subband that is selectable by the network entity, that initiates paging. The system bandwidth assumed in this embodiment is 20 MHz and two UE capabilities of 10 and 15 MHz are considered.

The frequency subband 2 is selected to transmit the complete paging message, Resource Blocks 1 and 2, and the frequency diversity repetition of the first Resource Block 1. For the frequency diversity repetition of Resource Block 2, frequency subband 1 is selected. Accordingly, the 15 MHz UE is able to correctly receive the paging message, as it completely covers both subbands in one subframe.

However, because of 10 MHz UEs in the cell, it is further necessary to re-transmit the second Resource Block after a coherence time Tcoh in the central band of the system bandwidth. Thereby, both terminals are provided with the paging message and the diversity repetition thereof.

It is further possible, that the time diversity repetition of the second Resource Block after coherence time may also be transmitted in a different subband from the central band (not shown). That is, the frequency subband used for transmitting each Resource Block of the paging message, including actual paging message and diversity repetition thereof, is freely selectable. However, in that case the UE would have to shift its frequency range from the central band to a center frequency that would cover the selected frequency subband. To achieve this, the 10 MHz UE has to be informed on the BCH that within the first subframe the complete paging message and the repetition of the first Resource Block is transmitted in the central subband 2, and that after a coherence time the repetition of the second Resource Block is to be received in frequency subband 1. Hence, the 10 MHz UE shifts its frequency range after the first subframe so as to cover the indicated frequency subband and is thus able to receive the repetition of Resource Block 2.

The selection of the frequency subbands in which the paging messages are to be transmitted may be based on different conditions.

At first, the traffic density in the respective subbands may be crucial for the decision which subband to use. The traffic density may be measured in the E-Node B or in a similar entity of the radio access network that has access to the radio resources of the cell, like for example a Base Station or a Radio Network Controller (RNC).

Figure 5:
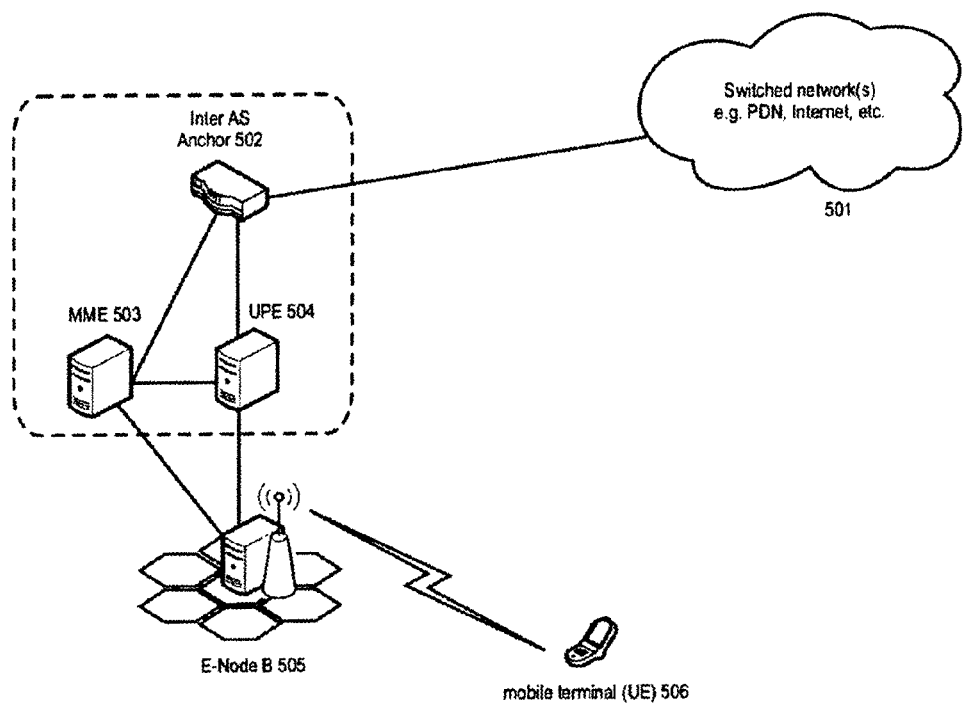
FIG. 5 shows an exemplary logical high-level architecture for the evolved mobile communication system in which the embodiments of the invention may be conducted.

To better understand the specific embodiments, FIG. 5 shows an exemplary logical high-level architecture for the evolved mobile communication system in which the invention may be conducted. The system comprises an Inter Access System Anchor (Inter AS Anchor), being a user plane anchor for mobility between different access systems and supporting handover between different access systems. Functions of the anchor are, e.g.

Packet routing and forwarding,
Authentication, authorization and key management,
Policy and Charging Enforcement Function,
Gateway to PDNs, including IP address allocation from PDN address space Furthermore the architecture comprises a Mobility Management Entity (MME) and User Plane Entity (UPE). The functions of the MME are, e.g., Management and storage of UE control plane context,
Mobility management,
Authentication, authorization and key management,
Ciphering/integrity termination for signalling,
Management and allocation of temporary user identities, and the functions of the UPE are, e.g., Management and storage of UE user plane context
Packet routing and forwarding,
Policy and Charging Enforcement Function,
Ciphering termination for user plane traffic,
Trigger/initiation of paging when downlink data arrive for the UE in idle state.

The MME, UPE and Inter AS Anchor are logical entities, i.e. the functionalities can be, e.g., deployed in different physical entities or combined in one single physical entity. Furthermore it is possible to have multiple MMEs, UPEs or anchors within one operator domain. Thus, with multiple MMEs/UPEs the data packet route from the anchor to the UE can be optimized, or the load can be shared between different MMEs/UPEs. In addition, the network can provide connectivity to different PDNs (Packet Data Networks) over one or multiple Inter AS Anchors in the operator domain.

Paging may be initiated by UPE if it relates to arrival of User Plane information (e.g. incoming call from network for a mobile node) or by MME if it relates to Control Plane messaging (e.g. transition from LTE_Idle to LTE_Active state). In the following it will be assumed that the paging is initiated from UPE without loss of generality, but the extension to the case wherein paging origination is done from MME is straight-forward.

An evolved Node B (E-Node B) in evolved UTRA is comparable to the Node B in legacy systems, in which the Node B controls the radio resources in a cell. More specifically, some of the Control Plane functionalities terminated in E-Node B (radio-resource protocol entity) comprise services and functions of the RRC sublayer:

Broadcast of System Information related to the non-access stratum (NAS);
Broadcast of System Information related to the access stratum (AS);
Paging (e.g. scheduling of paging message based on estimated load in the central band). In this invention it is assumed without loss of generality that the decision on scheduling of paging message in a specific frequency subband is done in network element initiating paging (MME/UPE) based on load estimation in E-Node B. However, it is also possible that E-Node B makes decision itself;
Establishment, maintenance and release of an RRC connection between the UE and E-UTRAN including:

Allocation of temporary identifiers between UE and E-UTRAN;

Configuration of radio resources for RRC connection.

In the evolved system, the terminal (UE) must be registered (attached) with the network to receive services that require registration. During the first registration with the network, a Default IP Access Service is established, the UE is provided with an IP address and a default context (comprising e.g. UE/user identities, mobility state, tracking area, security parameters, QoS information, internal routing information and other parameters) is established in the network.

Figure 6:
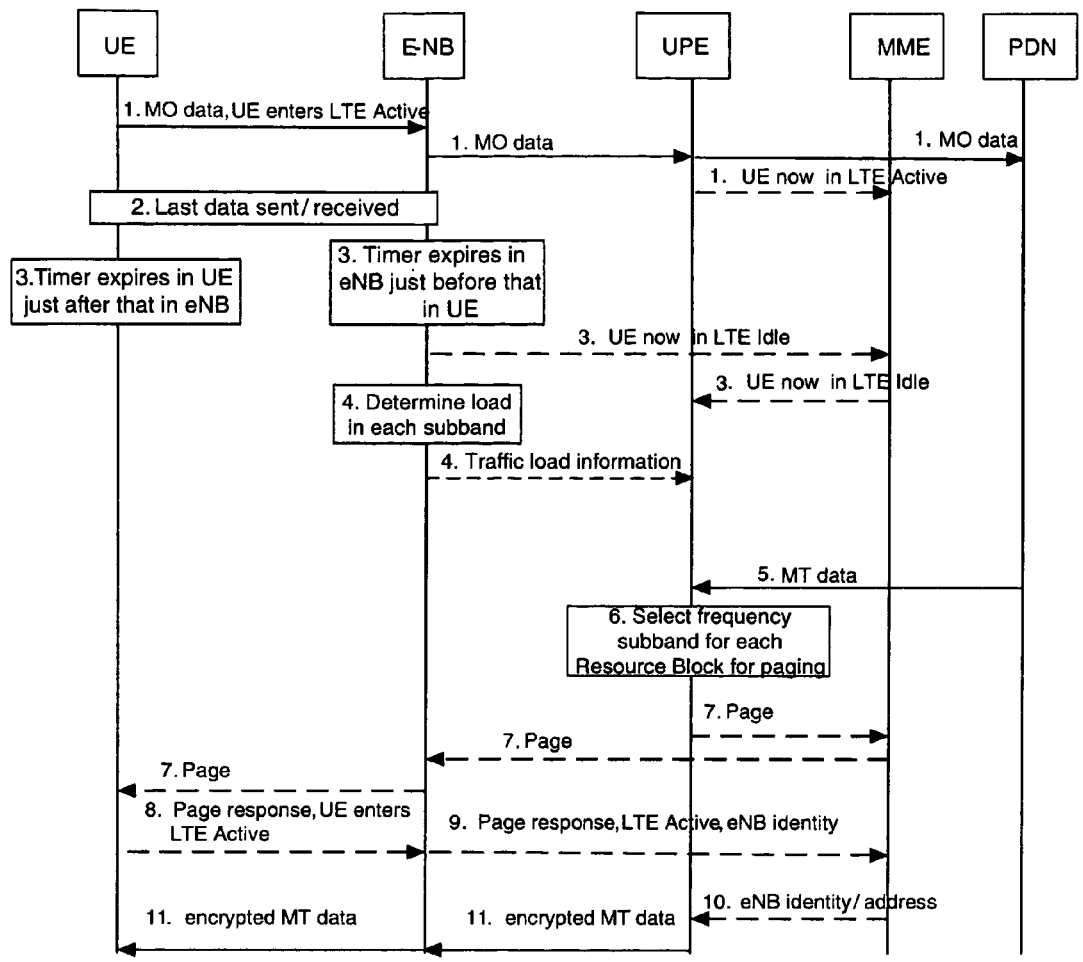
FIG. 6 shows a signaling diagram of a paging procedure according to an embodiment of the present invention.

FIG. 6 shows a signal diagram of a paging procedure according to one embodiment of the invention, wherein the selection of the frequency subband for transmitting paging is solely based on the traffic load. An assumption which is made in respect to FIG. 6 is that the network entity that initiates paging is the UPE. However, a different network entity, e.g. the MME, may be chosen to initiate the paging procedure without significant influence on the present invention. Furthermore, it is assumed that the entity that actually selects the frequency subbands is the network entity, for initiating paging. Nevertheless, also other entities, e.g. Node B, RNC, may instead select the subbands as stated in the summary of potential E-Node B functionalities.

The mobile terminal, UE, transmits uplink Mobile Originated (MO) data to the E-Node B, controlling its cell. During the transmission of data, the UE is in the Active state, LTE_Active. The MO data is further forwarded through the network to the Packet Data Network (PDN), via the UPE, which is responsible for the packet forwarding and routing. Additionally, UPE informs the MME about the UE being still in LTE_Active state.

Eventually, the uplink MO data flow pauses for enough time so that a timer in the UE and in the E-Node B lapses. If, for a predetermined time, the mobile terminal does not receive or transmit data, a corresponding timer expires and the mobile terminal changes into the Idle state to consume less power. To avoid further traffic on the radio interface between the UE and the Node B for informing about the state change, two timers are implemented in the system, one in the UE and on in the Node B. The network timer in the Node B is just shorter than the timer in the UE, in order to avoid losing mobile terminal data if the UE moves to another cell in LTE_Idle, while the network believes that the UE is in LTE_Active.

Accordingly, the Node B informs the MME about the change of state of the UE. The MME in turn informs the UPE that the mobile node is now in Idle state.

According to the invention, the E-Node B then starts to determine the load in each frequency subband. Subsequently, information about the traffic load in each subband is then transmitted periodically to the network entity, that initiates paging, in this case UPE. The period of providing this information may be configured by Radio Resource Control entity of the E-Node B. Alternatively, traffic load reporting may be triggered when comparing it against certain threshold. That is, when the threshold is exceeded, report is sent to UPE.

The UPE is thus provided with the necessary information to select a frequency subband for transmitting the paging messages, and thereby enabling a resource efficient frequency allocation of the Resource Blocks of the paging message. Alternatively, the load does not have to be reported, rather, the decision on frequency sub-band selection for paging could be made by the radio resource control entity itself, in this case by the E-Node B.

After sometime, presumably, downlink data arrives in the UPE that is directed to the UE. The UPE however knows that the UE is still in Idle mode and therefore at first has to buffer the incoming data. Subsequently, the UPE initiates the paging procedure by selecting frequency subbands on which the paging data is to be transmitted from the E-Node B to the UE. The selection is advantageously based on the load information periodically received from the E-Node B, as will be explained in more detail later. The UPE may decide which frequency subband is selected to transmit the paging message and includes the information about the selected frequency subband within a control plane message together with the paging message. Said control plane message is needed for the E-Node B, that in turn needs the information to utilize the selected subband for transmitting the paging message in its cell. In particular, the decisions on allocating resource blocks of a paging message to a specific subband are signaled on PICH or, alternatively in a SIB of BCH. Apart from decision on allocating resource blocks of a paging message to a particular frequency subband, further information related to configuration like modulation and forward error correction scheme may be transmitted on PICH or in a SIB of BCH. Additionally, the UPE may also decide which frequency subband to utilize for every Resource Block of the paging message and of the diversity repetition of the paging message.

As said before, these decisions may alternatively be carried out in the E Node B, thereby further reducing the signaling between Node B and UPE. In this case, the UPE transmits the paging message to the E Node B, after receiving and buffering downlink data for the UE. Subsequently, the E Node B is able to determine the current load conditions in the various subbands and therefore may also decide which subband to utilize for transmitting the resources blocks of the paging message. After selection of subbands, the E Node B transmits the necessary information about the selected frequency subbands to the UEs via the PICH or via a SIB of the BCH.

Again assuming that the UPE selects the subbands, the UPE then instructs the MME to page the UE. Accordingly, the MME requests all E-Node Bs in the tracking area of the UE to page the UE. Over the next DRX period, which is the periodicity of reading the PICH channel by the UE, all the E-Node Bs page the UE.

This includes the transmission of the PI of the group, the UE is allocated to, over the PICH. The UE listens in Idle state to the PICH, transmitted on the default central subband, recognizes its PI and starts listening to the PCH. In this respect, the UE is provided with configuration information over the BCH on central subband. The configuration information comprises the selection of the UPE in regard to the specific frequency subband on which the paging message, split into a plurality of Resource Blocks, is to be transmitted via the PCH. Consequently, the UE knows on which frequency subband to listen for each Resource Block of the paging message and of the diversity repetition.

After completely receiving the paging message, including the diversity repetition thereof, the UE responds to the paging by transmitting a response message to the E-Node B on which it is camped. Furthermore, the UE changes its state from Idle to Active. Subsequently, the E-Node B receives the paging response message and appends its cell identity/user plane address to the message and transmits same to the MME. The MME in turn informs the UPE about the E-Node B identity/user plane address of the E-Node B on which the UE is currently available.

Thus, the UPE is able to encrypt the awaiting downlink packets, previously stored, and to send them via the identified E-Node B to the destined UE.

In the previous example illustrated in FIG. 4, presumably a low traffic density in the central subband 2 is determined.

Therefore, the UPE (MME) decides to select the central subband 2 for transmitting the Resource Blocks 1 and 2 of the paging message and the frequency repetition of the Resource Block 1. It is further assumed, that by transmitting said three Resource Blocks 1, 2 and 1 in the central subband, the traffic load would then be too high to also transmit the remaining Resource Block 2 of the frequency diversity repetition. Therefore, Resource Block 2 is transmitted in subband 1, that is determined to have a lower traffic density than the central subband.

The 10 MHz UE in the cell is however not able to receive all resource blocks in one subframe, because its frequency range can only cover the central subband in one subframe. Consequently, the 10 MHz UE has to wait for the time-domain repetition of Resource Block 2 in the central subband 2, that is transmitted after a predetermined repetition time.

Figure 7:
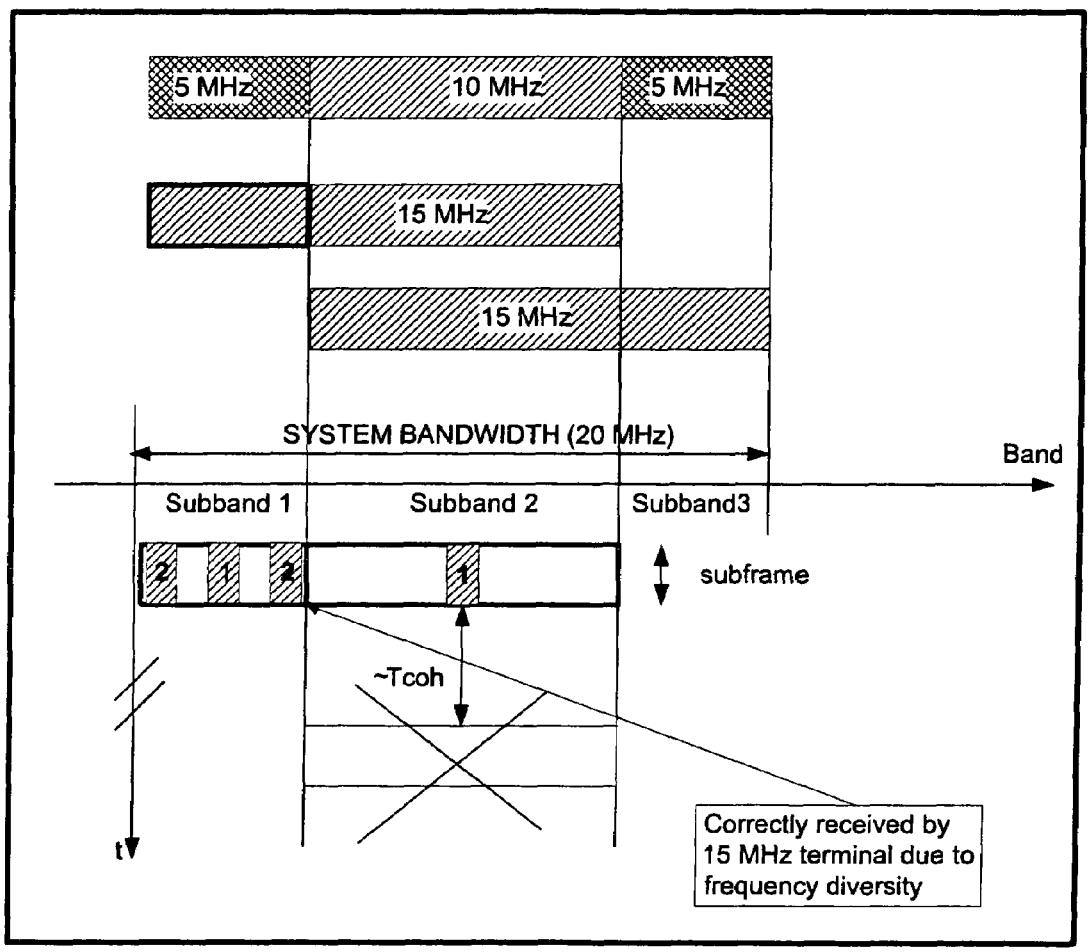
FIG. 7 shows a frequency allocation diagram for a paging procedure according to another embodiment of the invention.

On the other hand, in case a high traffic load is determined by the E-Node B in central subband 2, then the selection of the frequency subbands for transmitting the Resource Blocks is different than in the previous example. In particular, in FIG. 7 a frequency allocation is illustrated when the load in the central band is relatively high. In this example it is at first assumed that the minimum bandwidth capability of the user population is at least 15 MHz and therefore wider than bandwidth of the central subband 2.

Due to the high traffic in the central subband the complete paging message cannot be transmitted therein, and only Resource Block 1 of paging message is transmitted in the central subband 2. The remaining Resource Block 2 of the paging message and the Resource Blocks 1 and 2 of the frequency diversity repetition of the paging message are transmitted in another subband with lower traffic density, in this case subband 1.

As it is assumed that only 15 MHz UEs are present in the cell, no further retransmissions of Resource Blocks are necessary because the UEs are able to simultaneously cover both bands, subband 1 and 2. However, it should be noted that a shift of the UE's frequency range may be necessary, if said UE is currently camped on subbands 2 and 3. The necessary information in this regard is provided to the UE over the BCH in the central band via paging control information, contained in several SIBs.

However, in case 10 MHz UEs are also assumed in this scenario (not shown), a time diversity repetition of Resource Blocks is inevitable to reliably receive the paging message in those UEs. More specifically, supposedly a 10 MHz UE is camped at the beginning in the central subband, then the terminal would receive only Resource Block 1 in the first subframe. However, the terminal would not be able to also receive Resource Blocks 2, 1 and 2, because subband 1 is not within its covered frequency range. A time diversity repetition of Resource Blocks 2, 1 and 2 would be necessary after a predetermined coherence time.

Alternatively, it would be further advantageous in this example if the receiving frequency range of the UE is shifted at the beginning to fully cover subband 1 after the reception of the necessary paging control information for shifting. Consequently, the 10 MHz UE would receive Resource Blocks 1, 2 and 2 of frequency diversity repetition, whereas Resource Block 1 of the second paging message for frequency diversity repetition is not received in the UE, due to the not fully covered subband 2. Only Resource Block 1 would have to be retransmitted after a predetermined time in order to provide a sufficient diversity gain. Nevertheless, for low-end terminals a call session setup delay may not be decreased.

Figure 8:
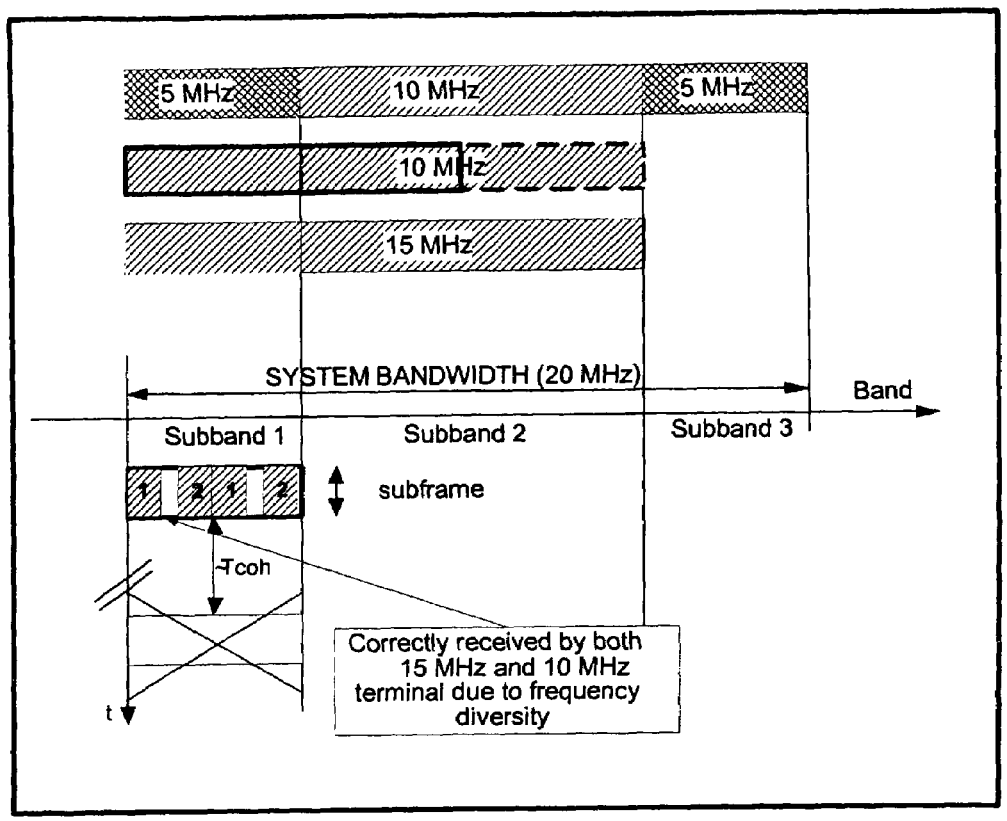
FIG. 8 shows a frequency allocation diagram for a paging procedure according to still another embodiment of the invention.

FIG. 8 illustrates a frequency allocation based on the assumption that the traffic density in the central band is too high for transmitting any Resource Block therein. Accordingly, a different subband is selected for transmitting the Resource Blocks. In this case, subband 1 is selected for every Resource Block of the paging message and its frequency diversity repetition, due to the low traffic density in subband 1. Advantageously, in this example both messages can be received by 10 MHz UEs and 15 MHz UEs within one subframe. No further retransmission of Resource Blocks is necessary for increasing the diversity gain. Nevertheless, for both terminals it might be necessary to shift its frequency range to include subband 1. In particular, the 10 MHz UE needs to shift its frequency range, because usually the UE is camped on central band of the system bandwidth. As shown in FIG. 8, the 10 MHz UE is first located on the central band, see frequency range with dashed border. Subsequently, after receiving appropriate information on BCH, the frequency range is shifted to subband 1, see frequency range with solid border. The 15 MHz UE is only forced to shift its frequency range, if the terminal was camped on subbands 2 and 3. In each case, the terminals are informed about the selected frequency range via the BCH.

In case the traffic density in subband 1 does not allow for the additional transmission of the frequency diversity repetition of Resource Blocks of the paging message, a different subband has to be selected (not shown). Only remaining subband 3 could be used, as also central subband 2 is not selectable for its high traffic load. In that case though, the disadvantage would arise that 10 MHz UE and the 15 MHz UE would not be able to receive both messages within one subframe, because their frequency ranges cannot cover the complete system bandwidth as would be necessary. Consequently, a time diversity repetition would be required, this however would increase the delay for reliably receiving the paging message. In order to allow for timely reception of PICH channel, this solution is then applicable only for 10 MHz terminals having DRX cycle longer than message retransmission time. Nevertheless, according to the invention, it is possible to adjust the frequency allocation in regard to radio resource conditions of available frequency subbands.

In a further embodiment of the invention it is further possible to base the selection of the frequency subband, used for transmitting the respective paging messages, on the relative importance of the specific Resource Block that is to be transmitted. It is for example possible that paging messages include System Information Block Type 7, which contains fast changing parameters and dynamic persistence level for uplink interference, in order to minimize delay incurred by a terminal, when acquiring this information from ordinary broadcast channel. Alternatively, SIB7 would have to be acquired from the broadcast channel after certain repetition time and after acquisition of MIB containing SIB scheduling information.

In this case, the Resource Block 2, carrying SIB7, is considered as having a lower importance relatively to Resource Block 1, comprising the fundamental paging message. If it is not received correctly together with other Resource Blocks of the extended paging message in the same subframe, it can be acquired through retransmission of the corresponding Resource Block or from the BCH. In general, a Resource block, containing information additional to the fundamental paging message, may be transmitted in a subframe outside of a minimum frequency capability of a terminal. Thus, a terminal having said minimum frequency capability would acquire fundamental paging message in a given subframe and additional resource block of smaller importance should be acquired later through the repetition. Thereby, the delay entailed by a complete and reliable reception of the fundamental paging message for state transition may be reduced and optimized.

Additional information that could be included in the paging message is, for example, shared channel resource allocation for initial access to the network, Radio Bearer setup information, etc. This additional information can be also classified according to its relative importance, similarly to SIB7 and fundamental message from the above example, and transmitted on side band or repeated in the central band for UEs having lower bandwidth capability.

It is further advantageous to consider the UE capability categories that are present in the radio cell when selecting a frequency subband for transmitting the paging message, and the diversity repetition thereof. For example, if only high-end terminals are located in the radio cell, then the spreading of the Resource Blocks over different frequency subbands of the system bandwidth is not unfavorable, because the high-end terminals are able to cover the required subbands within one subframe and no further delay occurs. Thus, the terminals delay for call session setup is reduced. However, if also low-end terminals are located in the radio cell, this would implicate further retransmissions in the time domain as the terminals with a low receiving frequency range, are not able to cover several subbands. By also considering the UE capabilities, the operator is thus enabled to flexibly adjust the paging transmissions to current conditions and to the population in the cell.

In still another embodiment, alternatively or in addition to changing the frequency allocation of the PCH, the transport format in the configuration of the PCH, on which the paging message is transmitted, may be changed. The transport format of the PCH may include several parameters necessary for a Mobile Node to appropriately decode and receive data on the PCH. Some parameters include the modulation format, coding rate of Forward Error Correction (FEC) or the amount and location of Resource Blocks that are to be transmitted for paging, etc.

Figure 9:
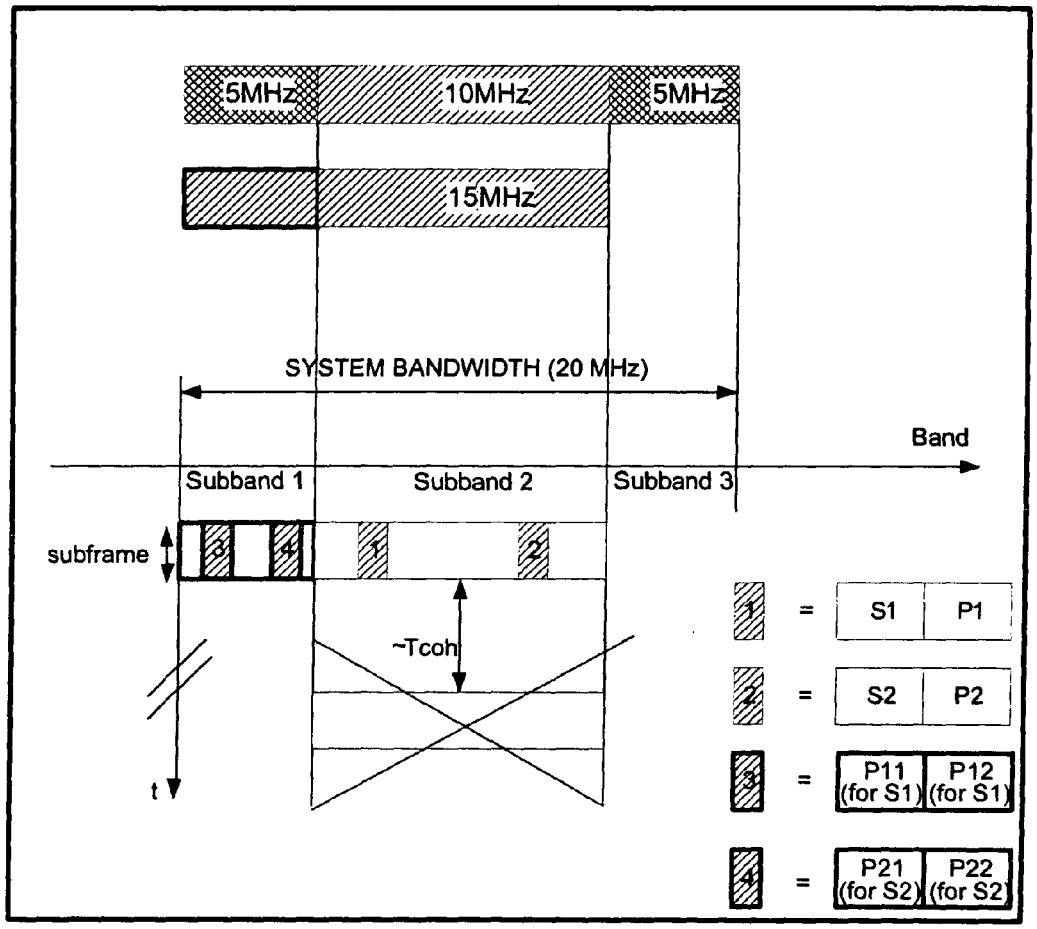
FIG. 9 shows a frequency allocation diagram for a paging procedure according to still another embodiment of the invention, in which additional error correction information is transmitted.

By decreasing the coding rate of a FEC scheme the diversity gain can be increased relative to simple repetition in frequency or time domain. In this variant of the present invention the coding rate is decreased by introducing additional parity bits in additional Resource Blocks 3 and 4. FIG. 9 shows a frequency allocation of Resource Blocks according to this embodiment of the invention. The Resource Blocks 1 and 2, comprising the paging message, already have parity bits within themselves. In particular, as illustrated in FIG. 9, each Resource Block 1 and 2, is composed of systematic bits, denoted S1, S2, and parity bits, denoted P1, P2. The systematic bits include the actual paging data, e.g. fundamental paging message or SIB7, whereas the parity bits are only provided for FEC. The additional Resource Blocks 3 and 4 are completely composed of parity bits for the systematic bits of Resource Blocks 1 and 2, respectively, as shown in FIG. 9. In particular, Resource Block 3 contains parity bits for S1, denoted P11, P12, and Resource Block 4 comprises parity bits for S2, denoted P21, P22. In one example, the coding rate may be decreased from 0.5 to 0.25, due to the additional amount of parity bits in Resource Blocks 3 and 4. Therefore, no time or frequency diversity technique is necessary anymore.

Moreover, similar to above discussed embodiments, system bandwidth of 20 MHz and UE with a 15 MHz frequency capability are assumed. According to this embodiment of the invention, the paging message is transmitted in Resource Blocks 1 and 2 on the central subband 2, due to sufficient transmission power in subband 2. In this exemplary implementation, the additional Resource Blocks 3 and 4, though, have to be transmitted in a subband different to the central subband, because by transmitting the paging message in the central subband, transmission of further Resource Blocks is presumably not possible. Accordingly, subband 1 has been selected by the UPE to transmit the additional parity bits in Resource Blocks 3 and 4.

Consequently, the 15 MHz UE is able to receive the complete paging message and the additional parity bits within one subframe with an improved coding rate of, e.g. 0.25, and a correspondingly high reliability. However, further terminals with lower frequency capabilities of e.g. 10 MHz can receive only the two original Resource Blocks 1 and 2, corresponding to the paging message, sent in the central subband 2, and thus with a lower reliability relative to high-end terminals.

If low-capability terminals reside in the cell of E-Node B, it would be therefore further necessary to retransmit the paging message or the additional Resource Blocks 3 and 4, with the parity bits, after a predetermined time to increase the reliability of the transmission (not shown).

Figure 10:
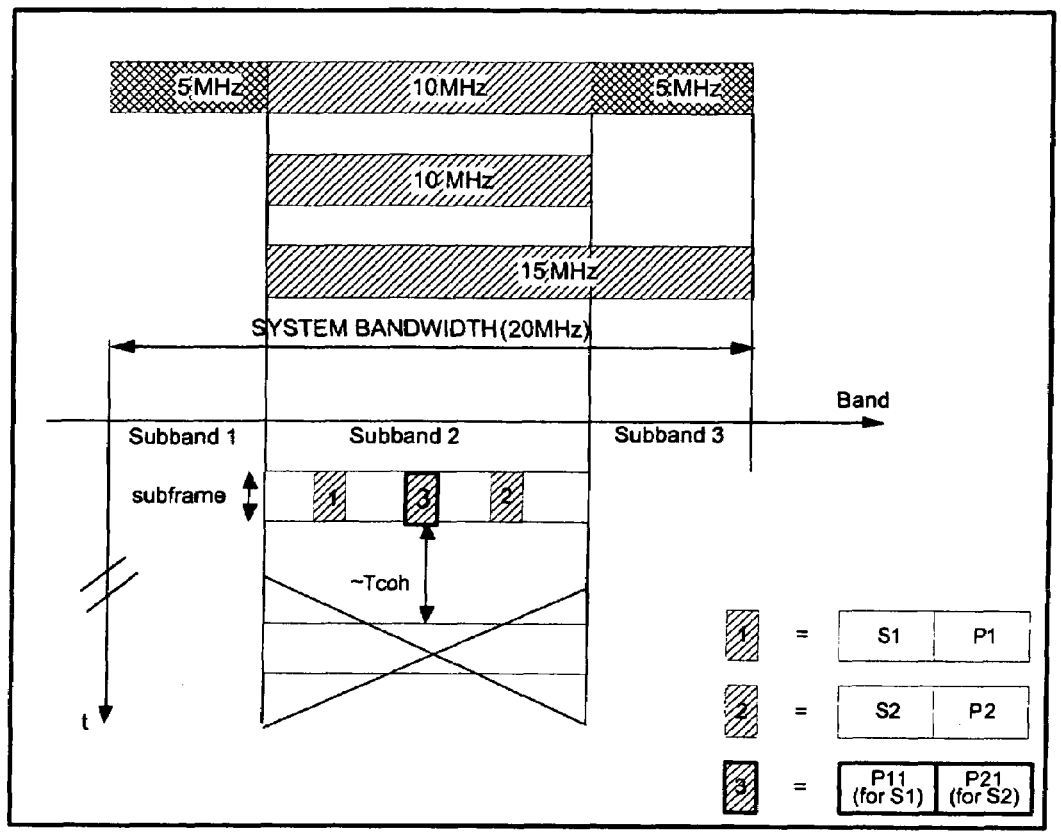
FIG. 10 shows a frequency allocation diagram for a paging procedure according to yet another embodiment of the invention, in which additional error correction information is transmitted.

FIG. 10 shows the frequency allocation of Resource Blocks according to another embodiment of the invention, wherein only one additional Resource Block, comprising parity bits, is transmitted for improving the transmission reliability. Correspondingly, Resource Block 3, comprises parity bits for the systematic bits of Resource Block 1, denoted P11, and further also comprises parity bits for the systematic bits of Resource Block 2, denoted P21.

Hence, only three Resource Blocks have to be transmitted, because Resource Block 3 combines additional parity bits for both Resource Blocks of the paging message. Depending on the traffic density in the respective frequency subbands, presumably, central subband 2 is selected for transmitting the three Resource Blocks, due to its low traffic load. Apparently, the 15 MHz UEs and the 10 MHz UEs are able to receive the complete paging message, including the additional parity bits of Resource Block 3 within one subframe. Hence, no retransmission in the time domain is necessary, and the changing from the LTE_Idle state to an LTE_Active state is expedited.

Nevertheless, other frequency allocations are possible, depending on the current load of the frequency subbands. It may be easily appreciated by a skilled person that depending on the selected subband for each Resource Block, either shifting of UE frequency ranges or frequency/time diversity repetition of specific Resource Blocks may become necessary in light of the different UE capabilities present in the cell.

In another embodiment of the present invention, it is possible to selectively transmit different configuration information of the PICH and PCH to UEs with different frequency capabilities.

More specifically, in a first option the complete configuration information, including transport format and frequency allocation, may be transmitted on the BCH Transport channel. According to a second option, the frequency allocation, regarding PCH and PICH, is transmitted on the BCH and the transport format is transmitted on PICH.

Some SIBs, comprising configuration information, are transmitted so that terminals of all capability categories are able to read same, and some SIBs, containing different configuration information, are transmitted in subbands, so that terminals only belonging to subsets of capability categories or just to a certain category are able to read same.

For example, SIB(x), which may comprise the PCH transport channel configuration parameters of the central subband, is directed to UEs of all capabilities. Accordingly, SIB(x) is read by all UE capabilities, e.g. 10 and 15 MHz UEs. Moreover, SIB(x+1), comprising additional indications for a high-end terminal to receive the diversity repetition in a different subband from the original paging message, is directed to only the subset of 15 MHz UEs.

In this way, assuming a 10 MHz and 15 MHz UE, the 10 MHz UE and 15 MHz UE are aware that the Resource Blocks of the original paging message are transmitted in the central band and have the necessary configuration parameters to read the central subband. However, only the 15 MHz UE receives the configuration information about the different subband and the indication that the frequency diversity repetition of the paging message is to be received in the different subband within the same subframe. As the 10 MHz UE does not receive said additional configuration information, the terminal is bound to wait for the repetition of the paging message or part of same in the time domain.

However, this has the advantage that the 10 MHz UE only has to receive and decode the SIBs which are indeed relevant and not every transmitted SIB. In other words, UEs are provided only with the configuration information relevant to their specific frequency capability. It is not necessary that a 10 MHz UE receives and decodes configuration information about subband 1, if it is not within its covered frequency range. Thereby, UEs may lower their power consumption because no unnecessary information has to be received and decoded.

It is easily apparent for a person skilled in the art that the present invention has various advantages. At first, the delay for receiving paging messages is reduced, due to the flexible and reliable transmission of the paging message, diversity repetitions and/or additional parity bits. Consequently, call setup delay is reduced, thereby expediting the state change from Idle to Active of a mobile node.

A further advantage is that radio resources of the frequency subbands, in particular the default central subband, can be used more efficiently, by providing the ability of selecting a frequency subband based on the current traffic load in same.

Consequently, the operator of the system or cell has flexibility of configuring also the paging transport format, depending on the traffic load of the subbands and on the available UE frequency capabilities in the radio cell.

Another embodiment of the invention relates to the implementation of the above described various embodiments using hardware and software. It is recognized that the various embodiments of the invention above may be implemented or performed using computing devices (processors), as for example general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the present invention may also be implemented by means of software modules which are executed by a processor or directly in hardware. Also a combination of software modules and a hardware implementation may be possible. The software modules or instructions may be stored on any kind of computer readable storage media, for example RAM, EPROM, EEPROM, flash memory, registers, hard disks, CD-ROM, DVD, etc.

The invention claimed is:

1. A paging method in a mobile communication system, wherein a preconfigured frequency range, split into a plurality of frequency subbands, is utilized for communicating within the mobile communication system, and the method comprises the steps of:
   selecting at least one frequency subband for transmitting paging information,
   transmitting paging information from a network entity, for initiating paging, utilizing the selected at least one frequency subband, wherein the paging information comprises paging control infoimation and a paging message, and wherein the paging control information is transmitted utilizing a default frequency subband within the preconfigured frequency range, and the step of selecting the at least one frequency subband comprises selecting the at least one frequency subband for transmitting the paging message,
   wherein a second paging message, being equal to the paging message, is transmitted, and the method further comprises the steps of:
   selecting at least one frequency subband for transmitting the second paging message, based on a determined load in each frequency subband, and
   transmitting the second paging message from the network entity, for initiating paging, utilizing the at least one frequency subband, selected for transmitting the second paging message,
   wherein the second paging message is split into at least one resource block, the at least one resource block being defined by a frequency range and a time range, in which data is transmitted and wherein the step of selecting the at least one frequency subband for transmitting the second paging message, selects for each resource block of the second paging message a frequency subband for transmitting the resource block of the second paging message, based on the determined load in each frequency subband.

2. The paging method of claim 1, wherein the selection of the at least one frequency subband is conducted in the network entity, for initiating paging or in a radio resource control entity of the radio access network.

3. The paging method of claim 1, wherein the selected at least one frequency subband is different from the default frequency subband.

4. The paging method of claim 1, wherein the paging control information comprises information about the selected at least one frequency subband, wherein a mobile node utilizes a first frequency range for communicating, said first frequency range comprising the default frequency subband and the method further comprises the step of:
   upon receiving the paging control information, comprising the information about the selected at least one frequency subband, in the mobile node, shifting the first frequency range of the mobile node so as to include the selected at least one frequency subband for receiving the paging message.

5. The paging method of claim 1, wherein a plurality of System Information Blocks contain different parts of the paging control information.

6. The paging method of claim 1, wherein the paging message is split into at least one resource block, the at least one resource block being defined by a frequency range and a time range in which data is transmitted, and wherein the step of selecting the at least one frequency subband for transmitting the paging message, selects for each resource block a frequency subband, for transmitting the resource block.

7. The paging method of claim 6, wherein the method further comprises the step of:
   determining the importance of the paging information within each resource block, and
   wherein the step of selecting the frequency subband for transmitting each resource block, is further based on its determined importance.

8. The paging method of claim 6, further comprising the steps of:
   determining for each resource block a frequency subrange within the selected frequency subband, and
   transmitting each resource block utilizing its determined frequency subrange.

9. The paging method of claim 1, wherein in case the determined load in each frequency subband, for transmitting the resource block of the second message, is high, retransmitting the resource block of the second paging message after a predetermined time utilizing the at least one frequency subband, selected for transmitting the paging message.

10. The paging method of claim 1, wherein the network entity, for initiating paging, is a control entity in the radio access network.

11. The paging method of claim 10, wherein the control entity in the radio access network is a User Plane Entity or a Mobility Management Entity.

12. The paging method of claim 1, wherein the network entity, for initiating paging, pages a plurality of mobile nodes, and the network entity, for initiating paging, has information about a first frequency range of each mobile node, utilized for communication by the mobile node, and wherein the step of selecting the at least one frequency subband, for transmitting the paging message, is further based on the information about the first frequency range of each mobile node.

13. The paging method of claim 12, wherein in case the first frequency range of one of the plurality of mobile nodes, paged by the network entity, for initiating paging, does not comprise the at least one frequency subband selected for transmitting the second paging message, the method further comprises the step of:
   retransmitting the second paging message after a predetermined time utilizing the at least one frequency subband, selected for transmitting the paging message.

14. The paging method of claim 1, wherein in case the first frequency range of one of the plurality of mobile nodes, paged by the network entity, for initiating paging, does not comprise the at least one frequency subband selected for transmitting the second paging message, the method further comprises the step of:
   re-transmitting the second paging message after a predetermined time utilizing the at least one frequency subband, selected for transmitting the paging message.

15. The paging method of claim 1, wherein an air resource control entity is connected between the network entity, for initiating paging and the mobile node, and wherein the network entity, for initiating paging, transmits the paging information to the air resource control entity and the air resource control entity forwards the paging information to the mobile node.

16. The paging method of claim 15, further comprising the steps of:
   upon receiving the paging information in the mobile node, transmitting a response message, as response to the paging information, to the air resource control entity,
   upon receiving the response message in the radio resource control entity, further appending an identifier of the radio resource control entity to the response message, and
   transmitting the response message to the network entity, for initiating paging.

17. The paging method of claim 1, wherein the paging control information further includes transport format indication.

18. The paging method of claim 17, wherein the paging control information is transmitted utilizing a paging indicator channel and a broadcast channel, the broadcast channel utilizes the default frequency subband, and the method further comprises the steps of:
   selecting and utilizing the broadcast channel or the paging indicator channel for transmitting the transport format indication.

19. The paging method of claim 17, wherein the paging entity pages a plurality of mobile nodes, the plurality of mobile nodes utilizing a small frequency range or a wide frequency range, both comprising a default frequency subband, and the method further comprises the steps of:
   transmitting a first transport format indication, comprising configuration information about the small frequency range, to the mobile nodes that utilize the small frequency range, and
   transmitting a second transport format indication, comprising configuration information about the wide frequency range, to the mobile nodes that utilize the wide frequency range.

20. A non-transitory computer-readable medium storing instructions that, when executed by a processor of a network entity, for initiating paging, causes the network entity to perform the steps of the method according to claim 1.

21. A network entity for initiating paging of a mobile node, utilizing a preconfigured frequency range, split into a plurality of frequency subbands, for communicating within a mobile communication system, wherein the network entity is connected via a radio resource control entity in the radio access network to a plurality of mobile nodes, comprising the mobile node, wherein the network entity comprises:
   a processor configured to select at least one frequency subband for transmitting paging information,
   a transmitter configured to transmit the paging information, utilizing the selected at least one frequency subband,
   wherein the paging information comprises paging control information and a paging message, and wherein the paging control information is transmitted utilizing a default frequency subband within the preconfigured frequency range, and the step of selecting the at least one frequency subband comprises selecting the at least one frequency subband for transmitting the paging message, and
   the processor is further configured to select at least one frequency subband for transmitting a second paging message, based on a determined load in each frequency subband,
   wherein the transmitter is configured to transmit the second paging message, being equal to the paging message, from the network entity, for initiating paging, utilizing the at least one frequency subband, selected for transmitting the second paging message, and
   wherein the second paging message is split into at least one resource block, the at least one resource block being defined by a frequency range and a time range, in which data is transmitted, and wherein the step of selecting the at least one frequency subband for transmitting the second paging message, selects for each resource block of the second paging message a frequency subband for transmitting the resource block of the second paging message, based on the determined load in each frequency subband.

22. The network entity of claim 21, wherein the network entity is further configured to perform the steps of a paging method in a mobile communication system, wherein a preconfigured frequency range, split into a plurality of frequency subbands, is utilized for communicating within the mobile communication system, and the method comprises the steps of selecting at least one frequency subband for transmitting paging information, and transmitting paging information from a network entity, for initiating paging, utilizing the selected at least one frequency subband.

* * * * *